US012792661B2

(12) United States Patent
Wang et al.

(10) Patent No.: US 12,792,661 B2
(45) Date of Patent: Nov. 10, 2026

(54) METHOD, DEVICE, AND PRODUCT FOR RETRIEVAL

(71) Applicant: Dell Products L.P., Round Rock, TX (US)

(72) Inventors: Zijia Wang, London (GB); Min Gong, Shanghai (CN); Qicheng Qiu, Shanghai (CN); Zhen Jia, Shanghai (CN)

(73) Assignee: Dell Products L.P., Round Rock, TX (US)

(*) Notice: Subject to any disclaimer, the term of this patent is extended or adjusted under 35 U.S.C. 154(b) by 127 days.

(21) Appl. No.: 18/676,994

(22) Filed: May 29, 2024

(65) Prior Publication Data

US 2025/0335497 A1 Oct. 30, 2025

(30) Foreign Application Priority Data

Apr. 24, 2024 (CN) ......................... 202410501501.1

(51) Int. Cl.
*G06F 16/51* (2019.01)
*G06F 16/56* (2019.01)
(Continued)

(52) U.S. Cl.
CPC .............. *G06F 16/51* (2019.01); *G06F 16/56* (2019.01); *G06V 10/77* (2022.01); *G06V 20/50* (2022.01)

(58) Field of Classification Search
CPC ......... G06F 16/51; G06F 16/56; G06V 10/77; G06V 20/50
See application file for complete search history.

(56) References Cited

U.S. PATENT DOCUMENTS 9,576,196 B1 * 2/2017 Natarajan .............. G06V 20/63
2018/0189572 A1 * 7/2018 Hori ....................... G06N 3/044
(Continued)

OTHER PUBLICATIONS

Snoek ("Early versus late fusion in semantic video analysis", Multimedia '05: Proceedings of the 13th annual ACM international conference on Multimedia, pp. 309-402, https://doi.rg/10.1145/1101149.1101236, Nov. 6, 2005) (Year: 2005).*
(Continued)

*Primary Examiner* — Apu M Mofiz
*Assistant Examiner* — Farhad Agharahimi
(74) *Attorney, Agent, or Firm* — Ryan, Mason & Lewis, LLP

(57) ABSTRACT

The present disclosure provides a method, a device, and a product for retrieval. The method includes acquiring context information related to an image and determining a representation of the image based on image data and the context information of the image, where the context information includes at least one of environment parameters, user behavior data, time elements, or field metadata. The method further includes encoding the representation as an image vector in a high-dimensional vector space and storing it into an image vector database. When retrieval is performed, a query that includes text information and that is for the image vector database is received, and an image associated with the text information is determined from the image vector database. The method according to the present disclosure can improve accuracy and efficiency for image retrieval.

20 Claims, 3 Drawing Sheets

(51) Int. Cl.
*G06V 10/77* (2022.01)
*G06V 20/50* (2022.01)

(56) References Cited

U.S. PATENT DOCUMENTS

| | | | | |
|---|---|---|---|---|
| 2019/0325273 | A1* | 10/2019 | Kumar | G06V 10/454 |
| 2022/0012297 | A1* | 1/2022 | Basu | G06F 16/953 |
| 2022/0121964 | A1* | 4/2022 | Ramakrishnan | G06N 5/022 |

OTHER PUBLICATIONS

B. Y. Reddy et al., "Context Unaware Knowledge Distillation for Image Retrieval," arXiv:2207.09070v1, Jul. 19, 2022, 12 pages.
Q. Zhang et al., "Context-Aware Attention Network for Image-Text Retrieval," IEEE/CVF Conference on Computer Vision and Pattern Recognition (CVPR), Jun. 2020, pp. 3536-3545.
K. S. Arun et al., "A Context-aware Semantic Modeling Framework for Efficient Image Retrieval," International Journal of Machine Learning and Cybernetics, vol. 8, Feb. 6, 2016, pp. 1259-1285. Abstract Only.
J. Li et al., "BLIP: Bootstrapping Language-Image Pre-training for Unified Vision-Language Understanding and Generation," arXiv:2201.12086v2, Feb. 15, 2022, 12 pages.

* cited by examiner

METHOD, DEVICE, AND PRODUCT FOR RETRIEVAL

RELATED APPLICATION

The present application claims priority to Chinese Patent Application No. 202410501501.1, filed Apr. 24, 2024, and entitled "Method, Device, and Product for Retrieval," which is incorporated by reference herein in its entirety.

FIELD

Illustrative embodiments of the present disclosure relate to the field of retrieval, and more specifically, relate to a method, a device, and a computer program product for image retrieval.

BACKGROUND

Image retrieval is a topic of great interest in computer vision and multimedia and aims to search for images related to a given query. According to different query types, image retrieval can be divided into two categories: content-based image retrieval (CBIR) and text-based image retrieval (TBIR). A CBIR system uses low-level visual features (such as color, texture, shape, etc.) to measure similarity between images, while a TBIR system uses textual descriptions (such as keywords, titles, labels, etc.) to retrieve images from a database.

However, both CBIR and TBIR have limitations when applied to specific-field contexts, and their processing level is insufficient in interpreting subtle aspects of the inherent context in professional fields, resulting in poor performance when the context is as important as the visual content per se. The reason is that in these specific-field contexts, the semantics and relevance of images depend not only on their visual content, but also on various context information, such as metadata, annotations, field knowledge, user preferences, etc. For example, in medical image retrieval, the diagnosis and treatment of patients may rely on the interpretations of images related to their medical records, symptoms, examination outcomes, etc. Similarly, in cultural heritage image retrieval, the historical and cultural significance of images may depend on their sources, origins, styles, etc. However, existing image retrieval systems typically rely only on visual data, which can cause inaccuracies when applied to specific-field contexts that require a detailed interpretation of images and related metadata. Therefore, it is imperative to develop an image retrieval system that can integrate context information with image content, and provide context-aware and semantic-based matching between queries and images.

SUMMARY

Illustrative embodiments of the present disclosure provide a method, a device, and a computer program product for retrieval. For example, some embodiments of the present disclosure provide a robust solution that integrates context information with image content, thereby enhancing the relevance and accuracy of image retrieval.

According to an aspect of the present disclosure, a method is provided. The method includes: acquiring context information related to an image, where the context information includes at least one of environment parameters, user behavior data, time elements, or field metadata; determining a representation of the image based on image data and the context information of the image; and encoding the representation as an image vector in a high-dimensional vector space and storing it into an image vector database.

According to another aspect of the present disclosure, an electronic device is provided. The electronic device includes at least one processor, and a memory coupled to the at least one processor and having instructions stored therein. The instructions, when executed by the at least one processor, cause the electronic device to perform actions. The actions comprise: acquiring context information related to an image, where the context information includes at least one of environment parameters, user behavior data, time elements, or field metadata; determining a representation of the image based on image data and the context information of the image; and encoding the representation as an image vector in a high-dimensional vector space and storing it into an image vector database.

According to still another aspect of the present disclosure, a computer program product is provided. The computer program product is tangibly stored on a non-transitory computer readable medium and comprises machine-executable instructions. The machine-executable instructions, when executed by a machine, cause the machine to perform actions. The actions comprise: acquiring context information related to an image, wherein the context information comprises at least one of environment parameters, user behavior data, time elements, or field metadata; determining a representation of the image based on image data and the context information of the image; and encoding the representation as an image vector in a high-dimensional vector space and storing it into an image vector database.

This Summary is provided to introduce relevant concepts in a simplified manner, and these concepts will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of exemplary embodiments of the present disclosure, provided in more detail herein with reference to the accompanying drawings, the above and other objects, features, and advantages of the present disclosure will become more apparent. In the exemplary embodiments of the present disclosure, the same reference numerals generally represent the same elements, and in which.

DETAILED DESCRIPTION

Figure 1:
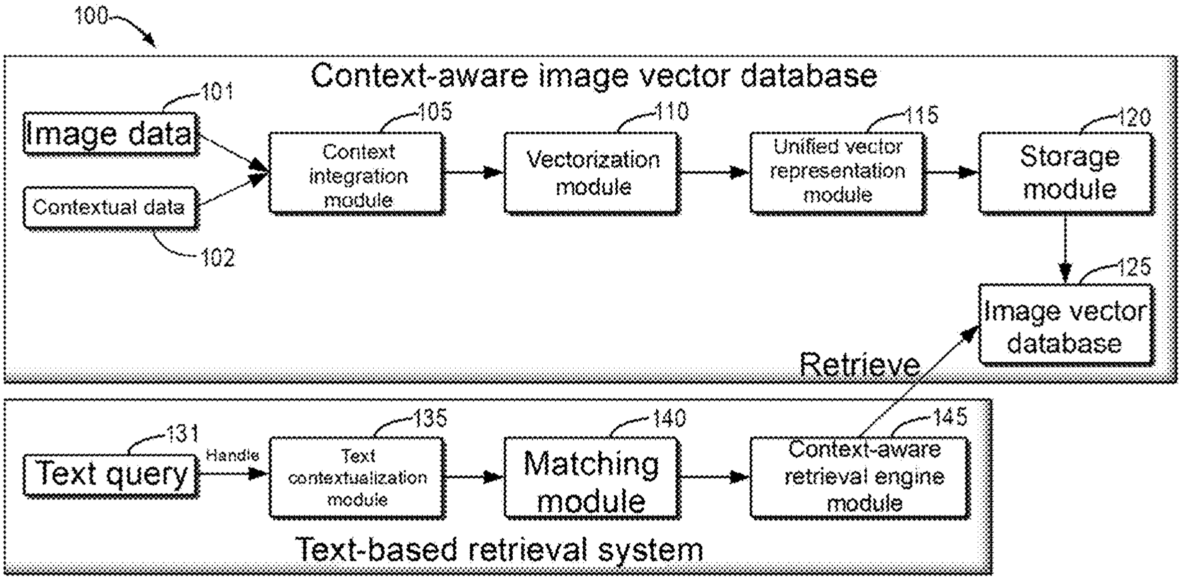
FIG. 1 is a schematic diagram of an image retrieval synthesizing system according to an embodiment of the present disclosure.

Illustrative embodiments of the present disclosure will be described in further detail below with reference to the accompanying drawings. Although some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and can fully convey the scope of the present disclosure to those skilled in the art.

The term “include” and variants thereof used herein indicate open-ended inclusion, that is, “including but not limited to.” Unless specifically stated, the term “or” means “and/or.” The term “based on” means “based at least in part on.” The terms “an example embodiment” and “an embodiment” indicate “at least one example embodiment.” The term “another embodiment” indicates “at least one additional embodiment.” The terms “first,” “second,” and the like may refer to different or identical objects, unless it is clearly stated that the terms refer to different objects.

The following embodiments are examples. Although the specification may mention “an,” “one,” or “some” embodiment(s) in some places, this does not necessarily mean that every such mention refers to the same embodiment, or that the feature only applies to a single embodiment. Individual features of different embodiments may also be combined to provide other embodiments. Furthermore, the words “including” and “containing” should be understood as not making a limitation that the embodiment is composed of only those features that have been mentioned, and such an embodiment may also include features/structures that have not been specifically mentioned.

As stated above, image retrieval is a topic of great interest in the fields of computer vision and multimedia. According to different query types, image retrieval can be divided into two categories: CBIR and TBIR. A CBIR system uses low-level visual features to measure similarity between images, while a TBIR system uses textual descriptions to retrieve images from a database. The main challenge in the current image retrieval field lies in the need to understand and utilize the context surrounding an image. Although traditional CBIR and TBIR systems are expert in handling simple queries based on visible features or associated text, both CBIR and TBIR have limitations when applied to specific-field contexts when queries involve subtle differences in complex specific fields. The reason is that in these specific-field contexts, the semantics and relevance of images depend not only on their visual content, but also on various context information, such as metadata, annotations, field knowledge, user preferences, etc. For example, in medical image retrieval, the diagnosis and treatment of patients may rely on the interpretation of images related to their medical records, symptoms, examination outcomes, etc. Similarly, in cultural heritage image retrieval, the historical and cultural significance of images may depend on their sources, origins, styles, etc.

Such image retrieval work involving specific fields requires addressing many challenges. For example, firstly, there is a lack of powerful mechanisms to integrate different context information with image data. The traditional image retrieval system often ignores enriched metadata, annotations, and specific-field knowledge, while such knowledge can significantly improve the retrieval performance. That is, the traditional image retrieval system often ignores enriched metadata, annotations, and specific-field knowledge, which consequently causes poor retrieval performance. Further, the existing image retrieval system mainly focuses on surface features or text descriptions, ignoring a deeper semantic connection that may be established between queries and image content when considering the context information. In addition, many image retrieval systems do not optimize scenes of specific fields, and in these scenes, relevance of images are greatly affected by the context, which causes low efficiency and inaccuracy in healthcare, cultural heritage, and other professional fields. Furthermore, there is currently a lack of a unified representation that encapsulates visual content and context information of an image. Therefore, a unified representation that can encapsulate visual content and context information of an image is needed to achieve more comprehensive and meaningful interpretations.

In other words, the existing image retrieval system typically relies only on visual data, which can cause inaccuracies when applied to specific-field contexts that require a detailed interpretation of images and related metadata. That is, the processing level of the existing image retrieval system is insufficient in interpreting subtle aspects of the inherent context in professional fields, resulting in poor performance when the context is as important as the visual content per se. Therefore, it is necessary to develop an image retrieval system that can integrate context information with image content, and provide context-aware and semantic-based matching between queries and images.

Some embodiments of the present disclosure provide a desirable image retrieval system. By means of the image retrieval system, a novel method for establishing a context-aware image vector database and a retrieval system can be provided. In the image retrieval system, contextual data alongside visual cues should be considered first. By encoding the data into a vectorized format, a detailed multidimensional representation of images stored in an easily retrievable database format can be created. When a retrieval query is initiated, the system uses context relevant matching algorithms to ensure that a text retrieval word aligns with the image in the vector database that is most context relevant.

According to some embodiments of the present disclosure, a multidimensional vectorizing process is provided, in which image data and various context information (such as metadata, annotations, field knowledge, etc.) are integrated to generate enriched image representations. As stated above, some embodiments of the present disclosure also provide an image retrieval system. The image retrieval system uses context-aware algorithms to interpret text queries and matches them with image vectors in the image vector database, rather than just matching based on visual similarity. In addition, the image retrieval system exhibits enhanced adaptability to a series of specific field scenarios, where the context can significantly affect the accuracy of image retrieval. The multidimensional vectorizing process and the context-aware image retrieval system together enhance adaptability and accuracy of image retrieval when applied in specific fields. Therefore, the solutions according to some embodiments of the present disclosure aim to address the aforementioned challenges by introducing the multidimensional vectorization process and the context-aware image retrieval system.

Regarding this, according to the present disclosure, a method, a device, and a computer program product for retrieval are provided. Specifically, in some embodiments, a method for retrieval is provided. The method includes acquiring context information related to an image and determining a representation of the image based on image data and the context information of the image, where the context information includes at least one of environment parameters, user behavior data, time elements, or field metadata. The method further includes encoding the representation as an image vector in a high-dimensional vector space and storing it into an image vector database. When retrieval is performed, the method may further include receiving a query that includes text information and that is for the image vector database, and determining, from the image vector database, an image associated with the text information.

The method for retrieval according to the present disclosure can improve accuracy and efficiency for image retrieval.

Basic principles and several example embodiments of the present disclosure will be described below with reference to FIG. 1 to FIG. 4. It should be understood that these exemplary embodiments are given only to enable those skilled in the art to better understand and thus implement the embodiments of the present disclosure, and are not intended to limit the scope of the present disclosure in any way.

The solution in some embodiments addresses the aforementioned challenges by introducing a synthesizing system for context-aware image retrieval. The system includes different but interconnected modules, each responsible for handling different aspects of the retrieval process. These modules include, for example, a context integration module, a vectorization module, and a retrieval engine module. An overall goal of the system is to create a cohesive framework. Based on this framework, not only can images be stored in vectorized form to enrich the context information, but these images can also be retrieved with high precision to respond to semantically complex queries. A schematic diagram of an image retrieval synthesizing system is shown in FIG. 1.

FIG. 1 is a schematic diagram of an image retrieval synthesizing system 100 according to an embodiment of the present disclosure. The image retrieval synthesizing system 100 mainly includes two parts, i.e., a context-aware image vector database system and a text-based retrieval system. As shown in FIG. 1, the context-aware image vector database system includes image data 101, contextual data 102, a context integration module 105, a vectorization module 110, a unified vector representation module 115, a storage module 120, and an image vector database 125. The text-based retrieval system includes a text query 131, a text contextualization module 135, a matching module 140, and a context-aware retrieval engine module 145.

As an example of processing involving the context-aware image vector database, the image data 101 and its contextual data 102 are acquired, and these data are processed through the context integration module 105, for example, the context integration module 105 integrates the image data 101 and the contextual data 102. This process is also referred to herein as the context integration module 105 fusing the image data 101 and its context (specifically, the contextual data 102) to generate a mixed data representation. Then, the vectorization module 110 vectorizes the mixed data representation into a vector form suitable for storage and retrieval, and stores it into the storage module 120 to compose the image vector database 125. Then, a retrieval engine (such as the context-aware retrieval engine module 145) can be used to query the image vectors stored in the image vector database 125, where the retrieval engine interprets a text query (such as the text query 131 shown in FIG. 1) in a context aware manner and acquires (or retrieves) an image that is most relevant with the text query from the image vector database 125.

Specifically, in embodiments of the present disclosure, in the context integration module 105, the image data 101 and its relevant contextual data 102 are used as inputs, and are combined to form an enriched representation. Regarding this, it will be explained in detail later with reference to FIG. 3.

In the vectorization module 110, a dedicated encoding algorithm is used to convert the enriched representation into a high-dimensional vector space, that is, a vectorized representation (which is also referred to as "image vector") in the high-dimensional vector space is generated.

In the unified vector representation module 115, unified processing is performed based on the vectorized representation generated by the vectorization module 110 to generate a unified representation that encapsulates visual content and context information of the image, thereby achieving more comprehensive and meaningful interpretations. The unified representation is input to the storage module 120.

In the storage module 120, the image vector on which unified processing is performed is organized and stored into the image vector database 125.

In the image vector database 125, the image vector can be optimized for retrieval. As an example of the optimization, for example, the image vector in the image vector database 125 is associated with an index in the image vector database 125. Associating an index with the image vector can improve a processing speed of retrieval and further improve the retrieval efficiency.

In the text-based retrieval system, the text query 131 ("text query," which is sometimes referred to as "query" for short) is received. The text query 131, for example, includes query keywords in text form, such as "T-shaped screws." The text query 131 is processed (for example, preprocessed) and input to the text contextualization module 135. As the processing or preprocessing, it may include, for example, deduplication, denoising, etc.

In the text contextualization module 135, the text query 131 is contextualized based on the context information, and mapped to the same high-dimensional vector space as the one where the image vector mentioned above exists to obtain the query vector corresponding to the text query 131. Equation (6) to be described below is utilized in an example method for obtaining the query vector. Here, the context information can be obtained by interpreting and expanding the text query 131 based on a knowledge database. For example, the knowledge database may have text information and/or images related to the "T-shaped screws," and a query vector is obtained by contextualizing the text query 131 based on the relevant text information and/or images. The query vector is input to the matching module 140.

The context-aware retrieval engine module 145 retrieves, from the image vector database 125, the image vector closest to the query vector. In the process, distances between various image vectors in the image vector database 125 and the query vector are compared by using the matching module 140 to find the image vector closest to the query vector. Equation (7) to be described below is utilized in an example method for comparing the distance between each image vector in the image vector database 125 and the query vector. The image corresponding to the closest image vector is the query result corresponding to the text query 131.

Each of the above steps involves computational techniques designed to improve efficiency and accuracy. In this way, the accuracy and efficiency of image retrieval can be improved.

Figure 2:
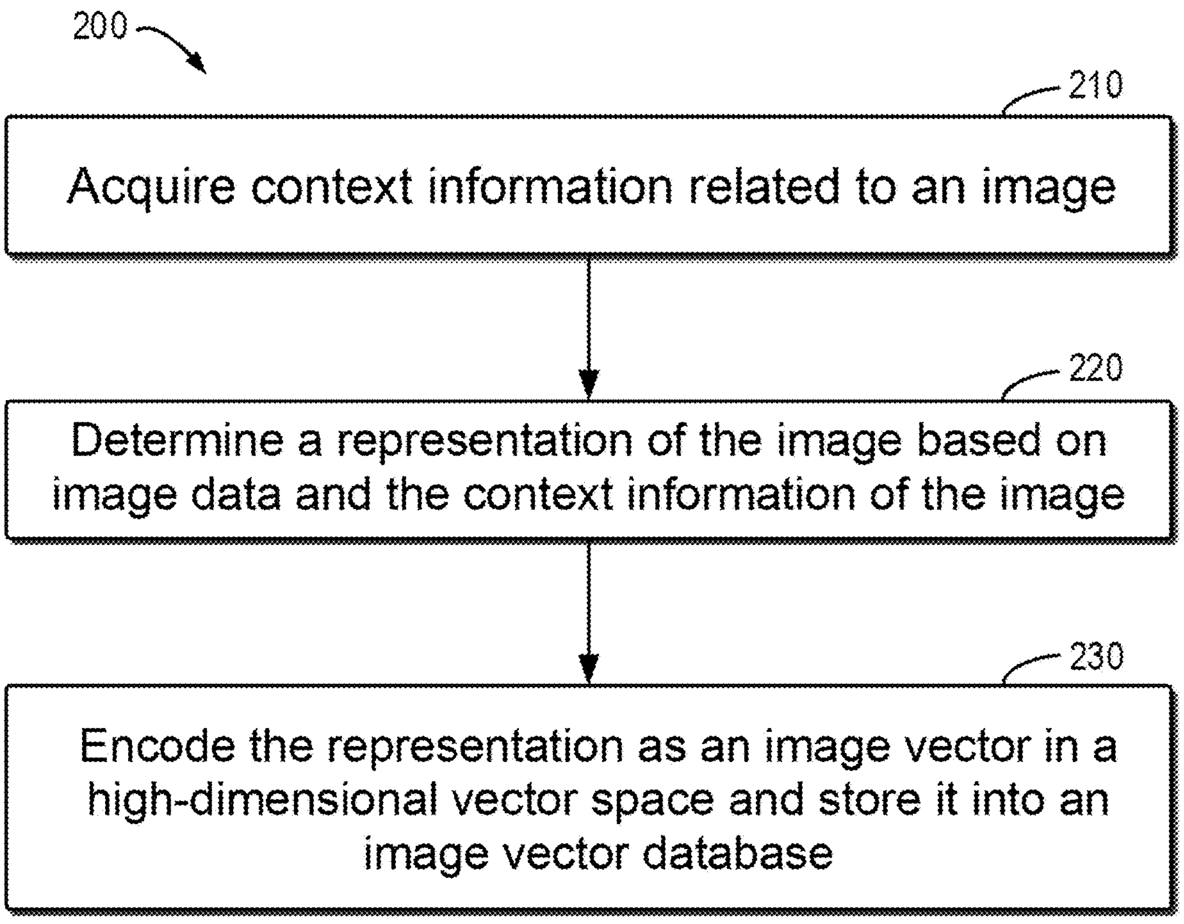
FIG. 2 is a flowchart of a method for retrieval according to an embodiment of the present disclosure.

FIG. 2 is a flowchart of an example method 200 for retrieval according to an embodiment of the present disclosure. As shown in FIG. 2, in the example method 200, in 210, context information (for example, the contextual data 102 shown in FIG. 1) related to an image is acquired, where the context information includes at least one of environment parameters, user behavior data, time elements, or field metadata. In 220, a representation of the image is determined based on image data (for example, the image data 101 shown in FIG. 1) and the context information of the image. To encode the representation as an image vector in a high-dimensional vector space, for example, the representation can be mapped to an image vector in the high-dimensional vector space by means of a deep learning model. The image vector is a vectorized representation of the image and the context information. In 230, the representation is encoded as an image vector in the high-dimensional vector space, and the image vector is stored into an image vector database (for example, the image vector database 125 shown in FIG. 1). When retrieval is performed, a query (for example, the text query 131 shown in FIG. 1) that is for the image vector database and that includes text information is received, and an image associated with the text information is determined from the image vector database.

In the method 200, a semantic relationship in a specific-field knowledge database can be learned by further using a transformer-based model, and the learned semantic relationship is mapped to original context information to generate the context information (for example, the contextual data 102 shown in FIG. 1).

To determine a representation of the image, the image data (for example, the image data 101 shown in FIG. 1) and the context information (for example, the contextual data 102 shown in FIG. 1) can be combined to generate a pre-fused representation, and an effect of the context information on the image can be dynamically adjusted by using a gating mechanism. In some embodiments, a vectorized representation can be generated by embedding the pre-fused representation into a semantic space.

In the method 200, the image vector in the image vector database may be further optimized for retrieval. As an example of the optimization, for example, the image vector can be associated with an index in the image vector database. The retrieval efficiency can be improved by means of such optimization.

To determine the image vector from the image vector database, the text information can be mapped to the high-dimensional vector space to obtain a query vector, and an image vector closest to the query vector can be determined from the image vector database. Regarding this, a normalized similarity between the query vector and an image vector in the image vector database can be determined by using a similarity function, and the image vectors can be sorted in an order of normalized similarities, so as to determine the image vector with the highest normalized similarity and determine an image corresponding to the image vector with the highest normalized similarity as a query result.

Figure 3:
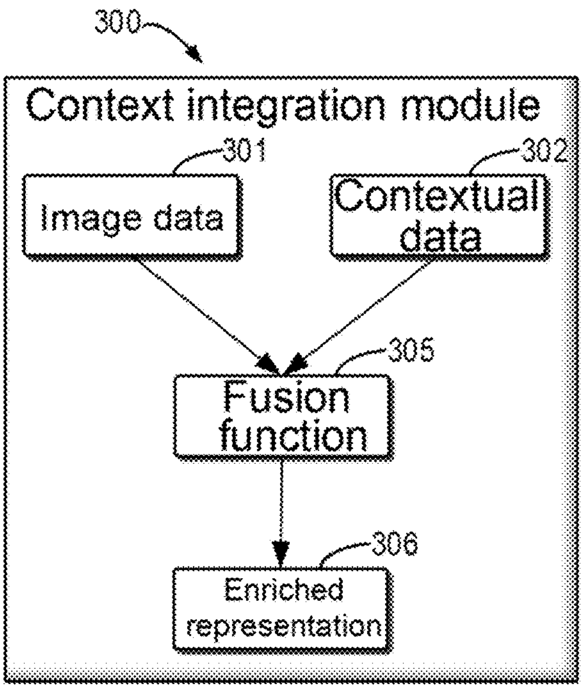
FIG. 3 is a schematic diagram of an enhanced context integration module according to an embodiment of the present disclosure.

FIG. 3 is a schematic diagram of an enhanced context integration module 300 according to an embodiment of the present disclosure. In the embodiment shown in FIG. 3, the enhanced context integration module 300 is used as, for example, the context integration module 105 in the image retrieval synthesizing system 100 shown in FIG. 1. That is, the enhanced context integration module 300 shown in FIG. 3 is an example of the context integration module 105 shown in FIG. 1. The enhanced context integration module 300 includes multiple advanced components that can synthesize contextual data and image data more deeply. Specifically, to handle complex and variable contextual data, the enhanced context integration module 300 introduces three new components: a context enrichment transformer (CET) component, a multimodal fusion gate (MFG) component, and a semantic context embedding (SCE) component.

The enhanced context integration module 300 receives original image data I (image data 301 in the figure) and a group of enriched contextual data C (contextual data 302 in the figure), where the contextual data C may include environmental factors, user behavior data, time elements, and metadata of specific fields. The image data I can be regarded as an example of the image data 101 shown in FIG. 1, and the contextual data C can be regarded as an example of the contextual data 102 shown in FIG. 1. As shown in FIG. 3, an enriched representation 306 is generated using the image data 301 and the contextual data 302 by means of a fusion function 305.

The CET component uses additional semantic information extracted from a specific-field knowledge database to enhance the original contextual data C so as to obtain enriched context $C_{enriched}$, where:

$$C_{enriched} = CET(C, K) \tag{1}$$

As stated above, the CET component uses a transformer-based model to learn a semantic relationship in the knowledge database and map the semantic relationship to the original contextual data C, so as to generate the enriched context $C_{enriched}$.

The MFG component intelligently combines the enriched context $C_{enriched}$ and the image data I to generate a pre-fused representation $R_{pre}$ of the image data I, and uses the gating mechanism to control an information flow. The pre-fused representation $R_{pre}$ is defined as:

$$R_{pre} = MFG(I, C_{enriched}) \tag{2}$$

The gate used in the gating mechanism utilizes a learned weighting system to dynamically adjust an effect of each context element according to relevance of each context element and the image data I, to ensure that the image data I and the contextual data C can achieve an optimal integration (which is also referred to as fusion).

Then, the SCE component embeds the pre-fused representation $R_{pre}$ into the semantic space by using a context-aware embedding function to provide a vectorized enriched representation R of the image data:

$$R = \psi(R_{pre}) \tag{3}$$

Such embedding aims to highlight the semantic consistency between the image data I and its contextual data C, thereby promoting more accurate retrieval.

After the enriched representation R is generated in the enhanced context integration module 300, a vectorization module (for example, the vectorization module 110 shown in FIG. 1) can convert the enriched representation R into a vector V in a high-dimensional vector space. Such vectorization is beneficial for the storage and retrieval process and enables a system to effectively perform image comparison according to the content and context of images.

The vectorized function V can be represented as:

$$V = \phi(R) \tag{4}$$

where $\phi$ is a conversion function which maps the enriched representation R to the high-dimensional vector space. The function is typically implemented by means of a deep learning model, and the deep learning model is trained to capture subtle differences of the contextual data C.

After vectorization, the system stores the generated vector V into an image vector database (for example, the image vector database 125 shown in FIG. 1). The image vector database optimizes high-dimensional data (for example, associating an index with the high-dimensional data), which is beneficial for efficient storage, indexing, and retrieval. The organization of the image vector database supports fast nearest neighbor search, which is crucial for the efficient and effective operation of a retrieval engine (for example, the context-aware retrieval engine module 145 shown in FIG. 1).

The structure of the image vector database can be represented by a set D composed of vectors:

$$\mathcal{D}=\{V_1, V_2, V_3, \ldots V_n\} \tag{5}$$

where each $V_i$ is a vectorized representation of the image data I and its associated contextual data C. The image vector database uses an indexing mechanism (for example, a k-dimensional tree or hash) to achieve efficient query operations.

The retrieval engine module (for example, the context-aware retrieval engine module 145 shown in FIG. 1) is a complex system component for handling the text query (for example, the text query 131 shown in FIG. 1) and retrieves images related to the contextual data C. After receiving a query Q (for example, the query Q can be regarded as an example of the text query 131 shown in FIG. 1), the retrieval engine module can use a two-step process to understand the query and match the query based on the contextual data C. The first step relates to conversion of a text query into a semantically enriched query vector $Q_v$, which is similar to the enriched representation R generated by a context integration module (for example, the enhanced context integration module 300 shown in FIG. 3):

$$Q_v = QueryContextualization(Q) \tag{6}$$

A QueryContextualization function maps the query Q to the high-dimensional vector space constructed by the vectorization module, so as to directly compare the image vectors stored in the image vector database.

Then, in the second step, a similarity function σ can be applied to calculate a cosine similarity between the query vector $Q_v$ and each image vector in the image vector database so as to find an image that is most relevant with the contextual data C:

$$\sigma(Q_v, V_i)=\frac{Q_v \cdot V_i}{\|Q_v\|\|V_i\|} \tag{7}$$

where $V_i$ represents each vector in the image vector database, the dot product operation measures the alignment between the query vector $Q_v$ and the image vector, and performs normalization according to sizes of the query vector $Q_v$ and the image vector. Then, the image vectors are sorted in an order of similarity scores of respective image vectors, and the image vector that best matches (the highest matching degree (or similarity)) the query vector $Q_v$ is retrieved. The image corresponding to the best matching image vector is used as a query result corresponding to the query Q.

The method in some embodiments advantageously enhances the understanding of context, which is crucial for specific field applications. By means of an enriched context integration process, an image retrieval system according to some implementations of the present disclosure can identify and utilize subtle semantic clues that are often ignored by traditional methods. The MFG component and the SCE component ensure that the contextual data is not just a supplement to an image representation, but a component that is fully integrated into the image representation. Such integration can achieve a higher dimensional vector space that preserves the semantic relationship, and related images are more likely to cluster together. Therefore, it improves the accuracy and recall rate of the retrieval process because the image retrieval system can now distinguish images with similar visual appearances but different contextual relevance. In addition, dynamic characteristics of the MFG component mean that the system can adapt to the contextual data of various types and structures without the need for manual adjustment, which represents a significant leap in the automatic image retrieval system.

According to the above technical solution in embodiments of the present disclosure, a wide range of context information is integrated using advanced natural language processing and semantic analysis. The MFG component is applied to dynamically adjust a fusion process based on contextual relevance. The SCE component is used to map enriched representations to a space that emphasizes the semantic consistency. A unified vector representation that includes images and contextual data is created to achieve more accurate, relevant, and efficient image retrieval. Specifically, some embodiments of the present disclosure provide effective solutions for customers that need complex image management (for example, healthcare providers with medical imaging needs or digital archives with extensive cultural heritage collections). By achieving more accurate and efficient retrieval, the time spent by professionals searching for images can be reduced, thereby optimizing the workflow and improving work efficiency.

Figure 4:
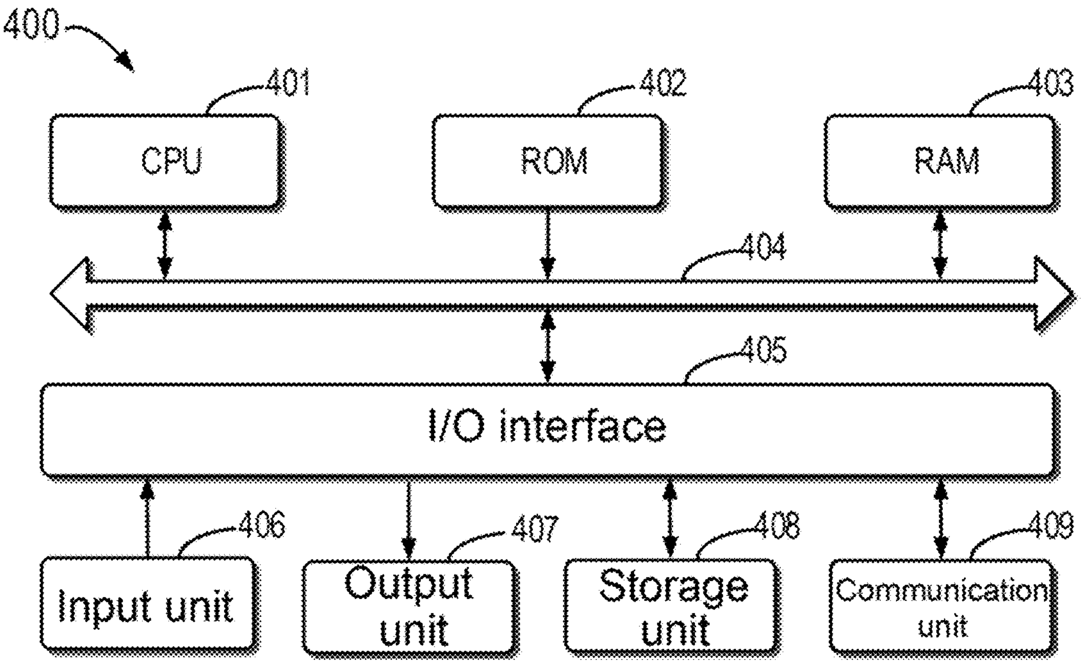
FIG. 4 is a block diagram of a device that can be used to implement embodiments of the present disclosure.

FIG. 4 is a block diagram of a device 400 that may be used to implement an embodiment of the present disclosure. The device 400 may be a device, an apparatus, or a system described in embodiments of the present disclosure. For example, the device 400 may be any hardware that carries out the method of the present disclosure, such as a server and a device (such as a terminal device). As shown in FIG. 4, the device 400 includes a central processing unit (CPU) 401 which may perform various appropriate actions and processing according to computer program instructions stored in a read-only memory (ROM) 402 or computer program instructions loaded from a storage unit 408 to a random access memory (RAM) 403. The RAM 403 may further store various programs and data required by operations of the device 400. The CPU 401, the ROM 402, and the RAM 403 are connected to each other through a bus 404. An input/output (I/O) interface 405 is also connected to the bus 404.

A plurality of components in the device 400 are connected to the I/O interface 405, including: an input unit 406, such as a keyboard and a mouse; an output unit 407, such as various types of displays and speakers; the storage unit 408, such as a magnetic disk and an optical disc; and a communication unit 409, such as a network card, a modem, or a wireless communication transceiver. The communication unit 409 allows the device 400 to exchange information/data with other devices through a computer network such as the Internet and/or various telecommunication networks.

The various methods or processes described above may be performed by the CPU 401. For example, in some embodiments, the method may be implemented as a computer software program that is tangibly included in a machine-readable medium, such as the storage unit 408. For example, in some embodiments, the method of the present disclosure may be implemented as a computer software program that is tangibly included in a machine-readable medium, such as the storage unit 408. In some embodiments, part of or all the computer program may be loaded and/or installed onto the device 400 via the ROM 402 and/or the communication unit 409. When the computer program is loaded into the RAM 403 and executed by the CPU 401, one or more steps or actions of the methods or processes described above may be executed.

As stated above, the present disclosure provides a novel method for retrieval. According to the method, context information related to an image is acquired, and a representation of the image is determined based on image data and the context information of the image, where the context information includes at least one of environment parameters, user behavior data, time elements, or field metadata. Then, the representation is encoded as an image vector in a high-dimensional vector space and stored into an image vector database. When retrieval is performed, a query that includes text information and that is for the image vector database is received, and an image associated with the text information is determined from the image vector database.

As mentioned above, image retrieval is performed by combining a nuanced understanding of the context and utilizing a series of collaborative modules to enhance the retrieval process, thereby solving the limitations of a traditional image retrieval system. Specifically, according to some embodiments of the present disclosure, image data is enriched by utilizing a context integration module through extensive context information. A multimodal fusion gate component and a semantic context embedding component are introduced to dynamically adapt to the properties of the context and embedded into a semantically enriched high-dimensional vector space. Meanwhile, advanced vectorization techniques are utilized to ensure a unified representation of images and context, thereby obtaining more accurate and relevant retrieval results. Illustrative embodiments of the present disclosure can be applied to various specific application scenarios, among which contextual relevance plays a crucial role in image interpretation. Therefore, the method for retrieval according to the present disclosure can improve the accuracy and efficiency for image retrieval and serve as an important tool for managing and retrieving image data from various industries from healthcare to cultural heritage.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks (including a local area network (LAN) or a wide area network (WAN)) or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions can be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in an order different from that shown in the drawings. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of a dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:

acquiring context information related to an image, wherein the context information comprises at least one of environment parameters, user behavior data, time elements, or field metadata;

enhancing the context information utilizing additional information extracted from a knowledge database via at least one transformer-based model that learns a semantic relationship from the knowledge database and adjusts the context information based on the learned semantic relationship to obtain enhanced context information;

determining a representation of the image based on image data and the enhanced context information of the image, utilizing (i) a multi-modal fusion gate configured to combine the image data and the enhanced context information of the image to generate a pre-fused representation of the image data, the multi-modal fusion gate comprising a learned weighting system configured to dynamically adjust an effect of each of a plurality of context elements of the enhanced context information in accordance with its relevance to the image data, in generating the pre-fused representation of the image data, in order to facilitate subsequent generation of a fused representation of the image data, and (ii) a context-aware embedding function configured to process the pre-fused representation received from an output of the multi-modal fusion gate for embedding into a semantic space, the context-aware embedding function generating the fused representation of the image data by embedding the pre-fused representation into the semantic space, wherein the transformer-based model, the multi-modal fusion gate and the context-aware embedding function are implemented as respective serially-arranged components of a single unitary fusion function; and encoding the fused representation as an image vector in a high-dimensional vector space and storing it into an image vector database.

2. The method according to claim 1, further comprising:

receiving a query to the image vector database, wherein the query comprises text information; and determining, from the image vector database, an image associated with the text information.

3. The method according to claim 1, further comprising:

learning the semantic relationship in a specific-field version of the knowledge database by using the transformer-based model; and mapping the learned semantic relationship to original context information to generate the enhanced context information.

4. The method according to claim 1, wherein generating the pre- fused representation comprises dynamically adjusting an effect of the enhanced context information on the image by using a gating mechanism of the multi-modal fusion gate.

5. The method according to claim 1, wherein the fused representation is generated as a vectorized representation.

6. The method according to claim 1, further comprising:

optimizing the image vector in the image vector database for retrieval.

7. The method according to claim 6, wherein optimizing the image vector comprises:

associating the image vector with an index in the image vector database.

8. The method according to claim 1, wherein encoding the representation as the image vector in the high-dimensional vector space comprises:

mapping the representation to the image vector in the high-dimensional vector space by means of a deep learning model.

9. The method according to claim 1, wherein the image vector in the high-dimensional vector space is a vectorized representation of the image and the context information.

10. The method according to claim 2, wherein determining the image vector from the image vector database comprises:

mapping the text information to the high-dimensional vector space to obtain a query vector; and determining, from the image vector database, the image vector closest to the query vector.

11. The method according to claim 10, wherein determining, from the image vector database, the image vector closest to the query vector comprises:

determining, by using a similarity function, a normalized similarity between the query vector and an image vector from the image vector database;

sorting the image vectors in an order of normalized similarities; and determining the image vector with the highest normalized similarity.

12. An electronic device, comprising:

at least one processor; and memory coupled to the at least one processor and having instructions stored therein, wherein the instructions, when executed by the at least one processor, cause the electronic device to perform actions comprising:

acquiring context information related to an image, wherein the context information comprises at least one of environment parameters, user behavior data, time elements, or field metadata;

enhancing the context information utilizing additional information extracted from a knowledge database via at least one transformer-based model that learns a semantic relationship from the knowledge database and adjusts the context information based on the learned semantic relationship to obtain enhanced context information;

determining a representation of the image based on image data and the enhanced context information of the image, utilizing (i) a multi-modal fusion gate configured to combine the image data and the enhanced context information of the image to generate a pre-fused representation of the image data, the multi-modal fusion gate comprising a learned weighting system configured to dynamically adjust an effect of each of a plurality of context elements of the enhanced context information in accordance with its relevance to the image data, in generating the pre-fused representation of the image data, in order to facilitate subsequent generation of a fused representation of the image data, and (ii) a context-aware embedding function configured to process the pre-fused representation received from an output of the multi-modal fusion gate for embedding into a semantic space, the context-aware embedding function generating the fused representation of the image data by embedding the pre-fused representation into the semantic space, wherein the transformer-based model, the multi-modal fusion gate and the context-aware embedding function are implemented as respective serially-arranged components of a single unitary fusion function; and encoding the fused representation as an image vector in a high-dimensional vector space and storing it into an image vector database.

13. The electronic device according to claim 12, wherein the actions further comprise:

receiving a query to the image vector database, wherein the query comprises text information; and determining, from the image vector database, an image associated with the text information.

14. The electronic device according to claim 12, wherein the actions further comprise:

learning the semantic relationship in a specific-field version of the knowledge database by using the transformer-based model; and mapping the learned semantic relationship to original context information to generate the enhanced context information.

15. The electronic device according to claim 12, wherein generating the pre-fused representation comprises dynamically adjusting an effect of the enhanced context information on the image by using a gating mechanism of the multi-modal fusion gate.

16. The electronic device according to claim 12, wherein the fused representation is generated as a vectorized representation.

17. The electronic device according to claim 12, wherein actions further comprise:

optimizing the image vector in the image vector database for retrieval.

18. The electronic device according to claim 13, wherein determining the image vector from the image vector database comprises:

mapping the text information to the high-dimensional vector space to obtain a query vector; and determining, from the image vector database, the image vector closest to the query vector.

19. The electronic device according to claim 18, wherein determining, from the image vector database, the image vector closest to the query vector comprises:

determining, by using a similarity function, a normalized similarity between the query vector and an image vector from the image vector database;

sorting the image vectors in an order of normalized similarities; and determining the image vector with the highest normalized similarity.

20. A computer program product comprising a non-transitory computer readable medium having machine-executable instructions stored therein, wherein the machine-executable instructions, when executed by a machine, cause the machine to perform actions comprising:

acquiring context information related to an image, wherein the context information comprises at least one of environment parameters, user behavior data, time elements, or field metadata;

enhancing the context information utilizing additional information extracted from a knowledge database via at least one transformer-based model that learns a semantic relationship from the knowledge database and adjusts the context information based on the learned semantic relationship to obtain enhanced context information;

determining a representation of the image based on image data and the enhanced context information of the image, utilizing (i) a multi-modal fusion gate configured to combine the image data and the enhanced context information of the image to generate a pre-fused representation of the image data, the multi-modal fusion gate comprising a learned weighting system configured to dynamically adjust an effect of each of a plurality of context elements of the enhanced context information in accordance with its relevance to the image data, in generating the pre-fused representation of the image data, in order to facilitate subsequent generation of a fused representation of the image data, and (ii) a context-aware embedding function configured to process the pre-fused representation received from an output of the multi-modal fusion gate for embedding into a semantic space, the context-aware embedding function generating the fused representation of the image data by embedding the pre-fused representation into the semantic space, wherein the transformer-based model, the multi-modal fusion gate and the context-aware embedding function are implemented as respective serially-arranged components of a single unitary fusion function; and encoding the fused representation as an image vector in a high-dimensional vector space and storing it into an image vector database.

* * * * *